United States Patent [19]

Miro

[11] Patent Number: 5,238,891
[45] Date of Patent: Aug. 24, 1993

[54] OLEFIN POLYMERIZATION CATALYST AND PROCESS

[75] Inventor: Nemesio D. Miro, League City, Tex.

[73] Assignee: Phillips Petroleum Company, Bartlesville, Okla.

[21] Appl. No.: 366,720

[22] Filed: Jun. 15, 1989

[51] Int. Cl.$^5$ .............. B01J 31/14; C08F 4/52
[52] U.S. Cl. ................. 502/104; 502/113; 502/115; 502/116; 502/117; 502/125; 502/133; 502/134; 526/124; 526/125
[58] Field of Search .............. 502/113, 115, 116, 125, 502/133, 134, 104, 117; 526/114, 116, 119, 125, 126, 127, 128

[56] References Cited

U.S. PATENT DOCUMENTS

| | | | |
|---|---|---|---|
| 3,058,972 | 10/1962 | Fourcade et al. | 260/94.9 |
| 4,105,847 | 8/1978 | Ito et al. | 526/125 |
| 4,180,636 | 12/1979 | Hirota et al. | 526/125 |
| 4,218,339 | 8/1980 | Zucchini et al. | 252/429 B |
| 4,242,479 | 12/1980 | Yokota et al. | 526/124 |
| 4,304,891 | 12/1981 | Sato et al. | 526/97 |
| 4,359,402 | 11/1982 | Haas et al. | 252/429 B |
| 4,363,746 | 12/1982 | Capshew | 252/429 B |
| 4,390,454 | 6/1983 | Cuffiani et al. | 252/429 B |
| 4,394,291 | 7/1983 | Hawley | 252/429 B |
| 4,396,534 | 8/1983 | Matsuura et al. | 526/125 |
| 4,399,055 | 8/1983 | Matsuura et al. | 252/429 B |
| 4,405,769 | 9/1983 | Capshew et al. | 526/125 |
| 4,429,089 | 1/1984 | Pedretti et al. | 526/153 |
| 4,439,454 | 3/1984 | Riva | 424/329 |
| 4,477,588 | 10/1984 | Hawley | 502/119 |
| 4,537,870 | 8/1985 | Hawley | 502/111 |
| 4,562,168 | 12/1985 | Lee | 502/107 |
| 4,643,986 | 2/1987 | Morinaga et al. | 502/104 |
| 4,743,665 | 5/1988 | Sasaki et al. | 526/119 |
| 4,804,726 | 2/1989 | Kondo et al. | 526/124 |
| 4,904,630 | 2/1990 | Matsuura et al. | 502/125 |

FOREIGN PATENT DOCUMENTS 62-58367 12/1987 Japan.

*Primary Examiner*—Joseph L. Schofer
*Assistant Examiner*—R. H. Delmendo
*Attorney, Agent, or Firm*—Edward L. Bowman

[57] ABSTRACT

A method is disclosed for preparing an olefin polymerization catalyst of improved particle size from a solution of magnesium containing component and a transition metal containing component which is reacted with an organoaluminum halide compound. The improved particle size is provided by employing the organoaluminum halide compound in conjunction with a silicon compound, such as for example an alkyl silicate or a polysiloxane.

27 Claims, No Drawings

5,238,891

OLEFIN POLYMERIZATION CATALYST AND PROCESS

BACKGROUND OF THE INVENTION

The present invention relates to the polymerization of olefins. In another aspect the present invention relates to the preparation of catalysts useful for the polymerization of olefins.

A number of catalyst of varying activity for the polymerization of olefins have been prepared by forming a solution of a magnesium-containing component with a transition metal-containing component (hereinafter referred to as Mg-TrMe solution) and then contacting the Mg-TrMe solution with a reactant which results in the formation of a particulate catalyst or catalyst precursor. Some examples of such catalysts are shown in U.S. Pat. Nos. 4,477,588; 4,394,291; 4,562,168; 4,429,089; 4,537,870; and 4,363,746, the disclosures of which are incorporated herein by reference.

One problem that is encountered in the preparation of such solid catalyst components from a solution is the formation of significant amounts of fine particulate material. The presence of very fine particles can result in problems in the handling of the catalyst and the resulting polymer. Accordingly, in order to produce catalysts satisfactory for large scale commercial use it is generally necessary to carry out some additional step or treatment to obtain particulate catalyst components of the desired particle size.

One object of this invention is to provide new catalyst compositions that provide particularly high activity in the polymerization of olefins while at the same time being free of various disadvantages when used in the production of olefin polymers on a large commercial scale.

Another object of the present invention is to improve the particle size of particulate catalyst components prepared by the processes disclosed in U.S. Pat. Nos. 4,477,588; 4,394,291; 4,562,168; 4,429,089; 4,537,870; and 4,363,746.

Other aspects, objects, and advantages of the present invention will become apparent from the following disclosure.

SUMMARY OF THE INVENTION

In accordance with the present invention there is provided a method for preparing an olefin polymerization catalyst comprising forming a solution from a magnesium containing component and a transition metal containing component and then contacting the solution with an aluminum/silicon containing product resulting from the combination of an organoaluminum halide compound with a silicon compound.

The present invention is also concerned with the catalysts produced by the process and the use of such catalysts in the polymerization of olefins.

DETAILED DESCRIPTION OF THE INVENTION

A number of methods of forming Mg-TrMe solutions useful for preparing olefin polymerization catalysts are known in the art. Typically such methods involve the reaction of a magnesium containing component selected from one of the following groups:

(1) oxygen-containing organoaluminum compounds,
(2) compounds having the formula RMgX wherein X is a halogen atom, and R is an alkyl, aryl, or cycloalkyl radical containing 1-20 carbon atoms, (3) complexes of metallic Mg and hydroxylated organic compounds; and (4) Mg halides, Mg oxide, Mg hydroxide, Mg hydroxyhalide, and Mg salts of inorganic oxygen containing acids.

Some specific examples of oxygen-containing organomagnesium compounds include magnesium alkoxides (e.g., methylate, ethylate, isopropylate, decanolate, and cyclohexanolate), magnesium alkyl alkoxides (e.g., ethyl ethylate, etc.), magnesium hydroalkoxides (e.g., hydroxymethylate, naphthenate, phenathrenate, and cresolate), magnesium carboxylate (including hydrates thereof) (e.g. acetate, stearate, benzoate, phenylacetate, adipate, sebacate, phthalate, acrylate, and oleate), oxygen-containing organomagnesium compounds which also contain nitrogen (i.e., compounds containing a magnesium-oxygen-nitrogen organic group with the bonding in that order) (e.g. oximates; especially butyl oximate, dimethyl glyoximate, and cyclohexyloximate; hydroxamates), hydroxylamine salts; especially N-nitroso-N-phenylhydroxylamine derivatives, magnesium chelates (i.e., oxygen-containing organic compounds which contain at least one normal magnesium-oxygen organic bond in that order and at least one ligand bond and which is capable of forming a magnesium-containing hetero-ring, such as enolates, especially acetylacetonate; complexes derived from phenols which contain o- or m-position electron-donating groups (vis-a-vis a hydroxy group) such as 8- hydroxy quinolinate, and magnesium silanolates, i.e. compounds containing magnesium-oxygen-silicon-hydrocarbon group bonds in that order, such as triphenylsilanolate. Also included are compounds which contain several different organic groups such as magnesium methoxyethylate as well as complex alkoxides or phenoxides of magnesium and other metals, e.g. $Mg(Al(OC_2H_3))_2$ and $Mg_3(Al(OC_2H_5)6)_2$. Mixtures of such oxygen-containing organo magnesium compounds are also sometimes employed in preparing the Mg-TrMe solution.

Some specific examples of compounds of the above formula RMgX include $C_2H_5MgCl$, n-$C_4H_9MgCl$, n-$C_4H_9MgBr$, and products of a reaction of said grignard reagents with diphenyl disiloxane, methylhydropolysiloxiane, alpha.co-dimethyl dihydro polysiloxane or diphenyl silandiol.

Some specific examples of hydroxylated organic compounds often used with metallic magnesium to form said Mg-TrMe solution are alcohols, phenols, and organosilanols. Examples of such alcohols, phenols, and organosilanols are disclosed in Column 3, lines 17-35 of U.S. Pat. No. 4,804,726, the disclosure of which is incorporated herein by reference. In such embodiments the metallic magnesium can generally be used in any suitable form such as powder, particle, foil, or ribbon.

The inorganic magnesium compounds often used to make the Mg-TrMe solution include magnesium oxide, magnesium hydroxide, magnesium hydroxy halide, magnesium dihalide, and magnesium salts of inorganic oxygen containing acids, i.e. magnesium carbonate. Some specific examples of halogen containing magnesium compounds include anhydrous or hydrated magnesium dihalides, e.g. $MgCl_2$, $MgCl_2.6H_2O$, $MgCl_2.4H_2O$, $MgCl_2.2H_2O$, and $MgCl_2.H_2O$. Magnesium halide (preferably chloride) hydrolyzates which contain residual magnesium-halogen bonds are sometimes used. Mixtures of inorganic magnesium compounds are also contemplated. Some examples of such mixtures include MgCl$_2$.MgO.H$_2$O, MgCl$_2$.3MgO.7-H$_2$O, and MgBr$_2$.3MgO.6H$_2$O.

A particularly preferred type of magnesium-containing component is selected from compounds having the formula $$X_nMg(OR)_{2-n}$$

wherein X is a halogen atom, hydroxyl group, or an alkyl, aryl or cycloalkyl radical containing 1-20 carbon atoms; R is an alkyl, aryl, or cycloalkyl radical containing 1-20 carbon atoms; or a —COR' radical in which R' has the same meaning as R; n is a number in the range of 0 to 2; and products of reaction of such compounds with electron-donors.

The transition metal compounds used in forming the Mg-TrMe solution are Ti, V, or Zr compounds having at least one OR" group wherein R" is a hydrocarbyl group such as a straight or branched chain alkyl group, cycloalkyl group, arylalkyl group, aryl group, alkylaryl group having 1 to 20 carbon atoms, more preferably 1 to 10. Such include compounds of the formula [MeO$_a$-(OR")$_b$]$_m$ wherein R" is as defined above, Me is selected from Ti, V, or Zr; ; and a and b are numbers compatible with the valency of Me, a being zero or a number greater than zero and b being a number greater than zero; and m indicating a natural number.

Some specific examples of transition metal compounds falling within the above formula include titanium tetraethoxide, titanium tetra-n-propoxide, titanium tetra-i-propoxide, titanium tetra-n-butoxide, hexa-i-propoxy dititanate, Ti(OC$_6$H$_5$)$_4$, V(O-i-C$_3$H$_7$)$_4$, VO(O-i-C$_3$H$_7$)$_3$, Ti-triacetylacetonate, and diethoxy dimethoxy titanium.

Other examples of such transition compounds having at least one OR" group include haloalcholates such as (n-C$_4$H$_9$O)$_3$TiCl. The use of oxygen-containing transition metal compound having several different hydrocarbon groups are also within the term as used herein. In some cases mixtures of such transition metal compounds can be employed.

In forming the Mg-TrMe solution the magnesium-containing component and the transition metal component are contacted in a suitable liquid medium under suitable conditions to produce said solution. Typical liquid media include aliphatic, alicyclic, and aromatic hydrocarbons, halogenated derivatives thereof, and mixtures of such. Some typical examples of such liquids include isobutane, hexane, heptane, cyclohexane, benzene, toluene, xylene, monochlorobenzene, 1,2-dichloroethane, nitrobenzene, and methylene chloride.

In some cases it has been found desirable to include in the Mg-TrMe solution other components which affect catalyst productivity or selectivity. Often the additional components are electron donors such as ammonia, hydroxylamine, alcohols, ethers, carboxylic acids, esters, acid chlorides, amides, nitriles, amines, and substituted and unsubstituted phenols, naphthols and their sulfur-containing analogs, i.e. thiophenols. The preferred compounds are aromatic compounds selected from the group consisting of phenols, thiophenols, naphthols, aralkyl alcohols, aromatic acids, and aromatic esters. Examples of catalysts prepared using such electron donors are shown in U.S. Pat. No. 4,394,291.

The organoaluminum precipitating agent used in the present invention is selected from compounds having the general formula AlR$_n$X$_{3-n}$ wherein each R is individually selected from saturated and unsaturated hydrocarbyl radicals containing 1 to 20 carbon atoms per radical, S is a halogen and n is any number in the range of 1 to 2. Typical examples include methylaluminum dibromide, ethylaluminum dichloride, ethylaluminum diiodide isobutylaluminum dichloride, dodecylaluminum dibromide, dimethylaluninum bromide, diethylaluminum chloride, diisopropylaluminum chloride, methyp-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, and mixtures thereof. Particularly favored are ethylaluminum sesquichloride, ethylaluminum dichloride, and diethylaluminum chloride.

In accordance with the present invention the organoaluminum halide compound is combined with a silicon containing compound before being combined with the Mg-TrMe solution.

Examples of such silicon-containing compounds include (1) hydrocarbyloxy silanes and (2) polysiloxanes.

The term hydrocarbyloxy silanes refer to those compounds having at least one Si—O—R group wherein R is a hydrocarbyl radical containing 1-20 carbon atoms, more preferably 1-10 carbon atoms. Generally alkoxy silanes are preferred. The especially preferred hydrocarbyloxy silanes are the silicon tetrahydrocarbyloxides compounds having the formula $$Si(OR)_4$$

wherein each R is individually selected from the alkyl, cycloalky, aryl, alkaryl, and aralkyl hydrocarbon radical containing from 1 to 20 carbon atoms, more preferably 1 to 10 carbon atoms per radical.

Some specific examples of hydrocarbyloxy silanes include silicon tetraethoxide, tetramethoxysilane, triphenylethoxysilane, tetramethyldiethoxydisilane, dimethyltetraethoxydisilane, dichlorodiethoxysilane, tribromoethoxysilane, tetramethoxysilane, and the like.

The term polysiloxane as used herein refers to siloxane polymers of linear, cyclic, or three-dimensional structures having repeating units of the formula $$\left(\!\!\begin{array}{c}R\\|\\Si-O\\|\\R\end{array}\!\!\right)_{\!\!p}$$

wherein each R is individually selected from alkyl groups having 1-12 carbon atoms and alkoxy groups having 1-12 carbon atoms, and p is generally an integer of 2 to 10,000.

Some specific examples of such include hexamethyldisiloxane, octamethyltrisiloxane, methyethylpolysiloxane, dimethylpolysiloxane, diethylpolysiloxane, dimethoxypolysiloxane, diethoxypolysiloxane, hexamethylcyclotrisiloxane, octamethylcyclotetrasiloxane, decamethylcyclopentasiloxane, 2,4,6-trimethylcyclotrisiloxane, and the like.

For handling efficiency, liquid compounds are especially desirable as said polysiloxanes. More specifically, it is desirable that the viscosity at 25 degrees C. be 1 to 10,000 cst, preferably 1 to 1000 cst.

The amount of silicon compound required for the best improvement in particle size of the catalyst component will vary somewhat depending upon the silicon compound employed but can be determined by routine experimentation.

The amounts of magnesium component, transition metal component, and precipitating agent component can vary widely depending upon the specific compounds employed and the desired results. Typically in most such catalysts the atomic ratio between the magnesium and the transition metal will be in the range of about 1:0.01 to about 1:20, preferably about 1:0.1 to about about 1:5; and the atomic ratio between the magnesium and the aluminum will be in the range of about 1:0.1 to about 1:100, more preferably about 1:1 to about 1:20.

The conditions suitable for forming the Mg-TrMe solution are well known in the art. The precipitation with the mixture of aluminum halide and silicon compound can be conducted under any suitable conditions. Typically the conditions are the same as those that were previously used when the aluminum halide was employed without the silicon compound. Such conditions are disclosed U.S. Pat. Nos. 4,363,746 and 4,562,168. The conditions disclosed in the later patent are particularly desired. In that preferred embodiment the aluminum halide/silicon compound mixture is added to the Mg-TrMe solution at a temperature in the range of $-100°$ C. to about 70° C. and then the resulting mixture is heated at a higher temperature in the range of 50° C. to 110° C. for a period of time sufficient to obtain additional precipitation.

A preferred type of polymerization catalyst is prepared by contacting the solid resulting from the precipitation from the Mg-TrMe solution with an activating agent comprising a halogen-containing compound Ti, V, or Zr. Examples of such compounds include titanium tetrachloride, vanadium oxychloride, and zirconium tetrachloride. A variety of compounds can be polymerized with the catalysts produced by the present invention.

Olefins which can be homopolymerized or copolymerized with the invention catalyst include aliphatic mono-1 olefins. Olefins having 2 to 18 carbon atoms are most often used as the monomers or comonomers. Some typical examples of 1-olefins include ethylene, propylene, and 4-methyl-1-pentene. The mono-1 olefins can be polymerized according to the present invention employing either a particle form process, a solution form process, or a gas phase process. Aliphatic mono-1 olefins can be copolymerized with other 1-olefins and/or small amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

Some of the catalysts of this invention can also be used to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Typical comonomers, besides the conjugated diolefins listed above include mono-1-olefins of the type previously described and vinyl aromatic compounds generally. Some suitable vinyl aromatic compounds are those having from about 8 to about 14 carbon atoms per molecule, and include for example styrene and various alkylstyrene such as 4-ethylstyrene and compounds such as 1-vinyl-napthalene.

Typically the catalyst of the present invention will be used with a suitable amount of a cocatalyst selected from organometallic compounds of metals of Groups IA through IIIA of the Periodic Table. While it is not necessary in all cases to employ a cocatalyst with the particulate catalyst of the present invention, the use of cocatalysts is generally recommended for best results. Cocatalysts which can be used with such particulate catalysts can be selected from the hydrides and organometallic compounds of metals of Groups IA, II, and IIIA of the Periodic Table. Of the organometallic cocatalysts, organoaluminum compounds are generally preferred. Examples of such organoaluminum compounds include triethylaluminum, triisopropylaluminum, tridecylaluminum, triisoprenylaluminum, triisobutylaluminum, tri-n-butylaluminum, tri-n-decylaluminum, diisobutylaluminum hydride, ethylaluminum sesquichloride, diethylaluminum chloride, diisobutylaluminum chloride, and triphenylaluminum.

The most common organometallic cocatalyst is an organoaluminum compound of the formula $AlR_nX_{3-n}$, in which R is a hydrocarbon radical containing from about 1 to 20 carbon atoms, X is a halogen and n is a number such that $0 < n \leq 3$. R is preferably chosen from among alkyl, alkenyl, aryl, cycloalkyl, arylalkyl, and alkaryl radicals. If the organoaluminum compound contains a halogen, it is generally preferred that the halogen be chlorine.

A further understanding of the present invention, its advantages and objects, will be provided by the following examples.

EXAMPLE 1

A series of ethylene polymerization catalysts were prepared which were variations of the general type of catalyst disclosed in U.S. Pat. No. 4,363,746.

The amounts of the various components, when employed were as follows:

| | |
|---|---|
| Titanium tetraethoxide | 9.6 grams |
| 25 wt % EASC in heptane | 25 grams |
| Titanium tetrachloride | 30 grams |
| silicon tetraethoxide | 0.84 grams |

A Control Catalyst (Catalyst A) was prepared by combining $MgCl_2$ and titanium tetraethoxide in heptane and heating at a temperature in the range of about 95° C. in 100° C. obtain a solution. The solution was cooled and then ethylaluminum sesquichloride (EASC) was added at room temperature over one hour. The resulting solid was washed four times with pentane and then the solid was contacted with liquid titanium tetrachloride at room temperature for one hour.

Another Control Catalyst (Catalyst B) was prepared using the same general procedure as used in making Catalyst A except in this case the temperature was raised to 70° C. during the precipitation and held at that level for one hour. As is known in the art such a step heating process is disclosed in U.S. Pat. No. 4,562,168 as being capable of increasing the particle size of the precipitate. The precipitate obtained when washed four times with pentane and then the solid was contacted with liquid titanium tetrachloride at room temperature for one hour.

Still another catalyst (Catalyst C) was prepared by using the same general procedure as used in making Catalyst A except in this case the EASC was added at room temperature over 30 minutes then the silicon tetraethoxide was added while the temperature was raised to 70° C. After one hour at 70° C. the precipitate was recovered washed four times with pentane and then contacted with liquid titanium tetrachloride.

Inventive Catalyst (Catalyst D) was prepared by the same procedure as used in making Catalyst B except that in this case the precipitation was carried out using a mixture of EASC and silicon tetraethoxide. The resulting solid was recovered, washed four times with pentane, and then contacted with liquid tetrachloride.

Each of the resulting catalysts were recovered from the liquid $TiCl_4$ and washed four times with pentane. The yield of catalyst in grams for Catalysts B, C, and D was about twice that for Catalyst A. The settling rate of each solid catalyst was measured and the relative radius of the catalyst particles of each catalyst were determined using Stoke's Law. The results were as follows:

|  | Relative Radius |
|---|---|
| Catalyst A | 1.0 |
| Catalyst B | 1.20 |
| Catalyst C | 1.08 |
| Catalyst D | 1.38 |

The results thus indicate that as taught in the prior art the heat treatment used in making Catalyst B can increase the particle size. In this case the increase in relative radius of the catalyst particles was about 20%. The use of a complex of EASC and $Si(OEt)_4$ in making Catalyst D as taught by the present invention provided still a further increase in particle size, namely a 15% increase over heat treated Catalyst B. Catalyst C which used $Si(OEt)_4$ after the use of EASC provided some increase in particle size but nothing on the order of the type of increase provided by the present invention.

EXAMPLE 2

Another series of inventive catalysts were prepared.

In this case a Catalyst E was prepared using the procedure used in making Catalyst D except that three times as much silicon tetraethoxide was employed in combination with the EASC.

Catalyst F was prepared using the procedure used in making Catalyst D except that instead of silicon tetraethoxide a substantially linear polydimethylsiloxane having a molecular weight of about 5970 and a viscosity of about 100 cs was employed. The molar ratio of the polysiloxane to the EASC was 2 to 1. The EASC-polysiloxane mixture was heated to obtain a homogeneous solution prior to the addition of said mixture to the Mg-Ti solution.

Catalyst G was prepared in the same manner as Catalyst F except that a branched polydimethylsiloxane having a molecular weight of about 1650 and a viscosity of about 50 cs was employed instead of the linear polysiloxane. The molar ratio of polysiloxane to EASC was again 2 to 1.

Catalyst H was prepared using a procedure like that employed in preparing Catalyst G except that one ml of the branched polydimethylsiloxane was also used in making the Mg-Ti solution. The resulting solution was then contacted with a homogeneous solution resulting from the mixture of the EASC and the branched polydimethylsiloxane, again at the same polysiloxane to EASC molar ratio of 2 to 1.

The processes employed in making Catalysts E–H yielded about twice as many grams of catalyst as the process used in making Control Catalyst A.

EXAMPLE 3

Ethylene was polymerized using the various catalysts described above and the particle size of the resulting polymer particles was compared. The polymerizations were carried out under comparable conditions. The results are summarized in the following table:

| Catalyst | Variable | Melt Index (dg/min) | Polymer Size Analysis | | |
|---|---|---|---|---|---|
| | | | Median* | % < 100 | % < 200 Mesh |
| A | Control | 1.5 | 175 | 32.3 | 12.9 |
| B | Step Heated | 1.1 | 190 | 19.3 | 3.4 |
| E | Si(OEt)4 | 1.2 | 185 | 28.2 | 5.0 |
| F | Linear Polysiloxane | 0.9 | 265 | 11.8 | 2.0 |
| G | Branched Polysiloxane | 0.9 | 310 | 4.2 | 1.6 |
| H | Branched Polysiloxane (Method II) | 0.8 | 385 | 6.4 | 2.0 |

Catalysts F–H, i.e. those produced using a mixture of a polysiloxane and EASC, produced significant improvements over both Catalysts A and B. Although Catalyst E did not provide improved results as compared to Catalyst B it did provide an improvement as compared to Catalyst A.

That which is claimed is:

1. A method for preparing a particulate olefin polymerization catalyst component comprising forming a solution from components comprising a magnesium containing component and a transition metal containing component and then contacting the solution with the product resulting from the combination of an organoaluminum halide compound with a silicon compound to obtain said particulate catalyst component, wherein said magnesium-containing component is selected from one of the following groups:

(1) oxygen-containing organomagnesium compounds
   (2) compounds having the formula RMgX wherein X is a halogen atom, and R is an alkyl, aryl, or cycloalkyl radical containing 1–20 carbon atoms, and
   (3) inorganic Mg halides, Mg oxide, Mg hydroxide, Mg hydroxyhalide, and Mg salts of inorganic oxygen containing acids,
   wherein said transition metal containing component is selected from Ti, V, or Zr compounds having at lest one OR" group wherein R" is hydrocarbyl groups selected from straight or branched chain alkyl groups, cycloalkyl groups, arylalkyl groups, aryl groups, and alkylaryl groups having 1 to 20 carbon atoms,
   wherein said organoaluminum halide is selected from compounds having the general formula $AlR_nX_{3-n}$ wherein each R is individually selected from saturated and unsaturated hydrocarbyl radicals containing 1 to 20 carbon atoms per radical, X is a halogen and n is any number in the range of 1 to 2, and wherein said silicon compound is selected from hydrocarbyloxy silane compounds having at least one Si—O—R group wherein R is a hydrocarbyl radical containing 1-20 carbon atoms and polysiloxane polymers having repeating units of the formula

wherein each R is individually selected from alkyl groups having 1-12 carbon atoms and alkoxy groups having 1-12 carbon atoms.

2. A method according to claim 1 wherein said particulate catalyst component is then contacted with with an activating agent comprising a halogen-containing compounds Ti, V, or Zr.

3. A method according to claim 1 wherein said solution is contacted with the product resulting from the combination of said organoaluminum halide compound and a silicon tetrahydrocarbyloxide compound having the formula Si(OR)$_4$ wherein each R is individually selected from an alkyl, cycloalkyl, aryl, alkaryl, and aralkyl hydrocarbon radical containing from 1 to 20 carbon atoms.

4. A method according to claim 1 wherein said solution is contacted with the product resulting from the combination of said organoaluminum halide compound and a polysiloxane polymer having repeating units of the formula

wherein each R is individually selected from alkyl groups having 1-12 carbon atoms and alkoxy groups having 1-12 carbon atoms.

5. A method according to claim 1 wherein said magnesium containing component is selected from magnesium compounds of the formula X$_n$Mg(OR)$_{2-n}$ wherein X is a halogen atom, hydroxyl group, or an alkyl, aryl or cycloalkyl radical containing 1-20 carbon atoms; R is an alkyl, aryl, or cycloalkyl radical containing 1-20 carbon atoms, or a —COR' radical in which R' has the same meaning as R; n is a number in the range of 0 to 2; and the products of reaction of such compounds with electron-donors.

6. A method according to claim 5 wherein said transition metal containing component is selected from titanium tetraalkoxides.

7. A method according to claim 6 wherein said magnesium containing component consists essentially of magnesium dichloride.

8. A method according to claim 7 wherein said organoaluminum compound is ethylaluminum sesquichloride.

9. A method according to claim 8 wherein said transition metal containing component is titanium tetraethoxide.

10. A method according to claim 9 wherein said silicon compound is a polysiloxane polymer which is selected from polydimethylsiloxanes having molecular weights in the range of about 1500 to about 6000.

11. A method according to claim 9 wherein said silicon compound is tetraethoxy silane.

12. A method according to claim 9 wherein said solution is contacted with the product resulting from a combination of said organoaluminum halide compound and a polysiloxane polymer having repeating units of the formula

wherein each R is individually selected from alkyl groups having 1-12 carbon atoms and alkoxy groups having 1-12 carbon atoms.

13. A method according to claim 9 wherein said solution is contacted with the product resulting from a combination of said organoaluminum halide compound and a silicon tetrahydrocarbyloxide compound having the formula Si(OR)$_4$ wherein each R is individually selected from an alkyl, cycloalkyl, aryl, alkaryl, and aralkyl hydrocarbon radical containing from 1 to 20 carbon atoms.

14. A method according to claim 10 wherein said particulate catalyst is contacted with titanium tetrachloride.

15. A catalyst resulting from the method of claim 14.

16. A method according to claim 1 wherein said particulate catalyst is contacted with titanium tetrachloride.

17. A catalyst resulting from the method of claim 16.

18. A method for preparing a particulate olefin polymerization catalyst comprising forming a solution from components comprising magnesium dichloride and titanium tetraethoxide and then contacting the solution with the product resulting from the combination of ethylaluminum sesquichloride and silicon tetraethoxide to obtain a particulate catalyst component, wherein the atomic ratio of the magnesium to the titanium is in the range of about 1:0.01 to about 1:20, the atomic ratio of the magnesium to the aluminum is in the range of about 1:0.1 to about 1:100, and wherein the silicon tetraethoxide is employed in an amount which provides an improvement in the particle size of the catalyst over a catalyst prepared without using said silicon tetraethoxide in combination with the ethylaluminum sesquichloride.

19. A method according to claim 18 wherein said particulate catalyst component is contacted with titanium tetrachloride.

20. A method according to claim 19 wherein the atomic ratio of the magnesium to the titanium of the titanium tetraethoxide is in the range of about 1:0.1 to about 1:5 and the atomic ratio of the magnesium to the aluminum of the ethylaluminum sesquichloride is in the range of about 1:1 to about 1:20.

21. A catalyst resulting from the method of claim 20.

22. A method for preparing a particulate olefin polymerization catalyst comprising forming a solution from components comprising magnesium dichloride and titanium tetraethoxide and then contacting the solution with the product resulting from the combination of ethylaluminum sesquichloride and polysiloxane to obtain a particulate catalyst component, wherein the atomic ratio of the magnesium to the titanium is in the range to about 1:0.01 to about 1:20, the atomic ratio of the magnesium to the aluminum is in the range of about 1:0.1 to about 1:100, and wherein the polysiloxane employed in an amount which provides an improvement in the particle size of the catalyst over a catalyst prepared without using said polysiloxane combination with the ethylaluminum sesquichloride.

23. A method according to claim 22 wherein said particulate catalyst component is contacted with titanium tetrachloride.

24. A method according to claim 23 wherein the atomic ratio of the magnesium to the titanium of the titanium tetraethoxide is in the range of about 1:0.1 to about 1:5 and the atomic ratio of the magnesium to the aluminum of the ethylaluminum sesquichloride is in the range of about 1:1 to about 1:20.

25. A method according to claim 24 wherein the molar ratio of the polysiloxane to the ethylaluminum sesquichloride is about 2:1.

26. A catalyst produced by the method of claim 25.

27. A method according to claim 6 wherein the atomic ratio of the magnesium to the titanium is in the range of about 1:0.01 to about 1:20, the atomic ratio of the magnesium to the aluminum is in the range of about 1:0.1 to about 1:100, and wherein the silicon compound is employed in an amount which provides an improvement in the particle size of the catalyst over a catalyst prepared without said silicon compound.

* * * * *

UNITED STATES PATENT AND TRADEMARK OFFICE
CERTIFICATE OF CORRECTION

PATENT NO. : 5,238,891
DATED : August 24, 1993
INVENTOR(S) : Nemesio D. Miro

It is certified that error appears in the above-identified patent and that said Letters Patent is hereby corrected as shown below:

Column 8, line 57, please delete "lest" and insert therefor ---least---.

Column 9, line 20, please delete "compound" and insert therefor ---compounds---, and after "compounds", please insert ---of---.

Column 9, line 58, please delete "the".

Column 11, line 9, after "range", please delete "to".

Signed and Sealed this

Fifteenth Day of March, 1994

Attest:

BRUCE LEHMAN

*Attesting Officer*  *Commissioner of Patents and Trademarks*